Patented May 31, 1932

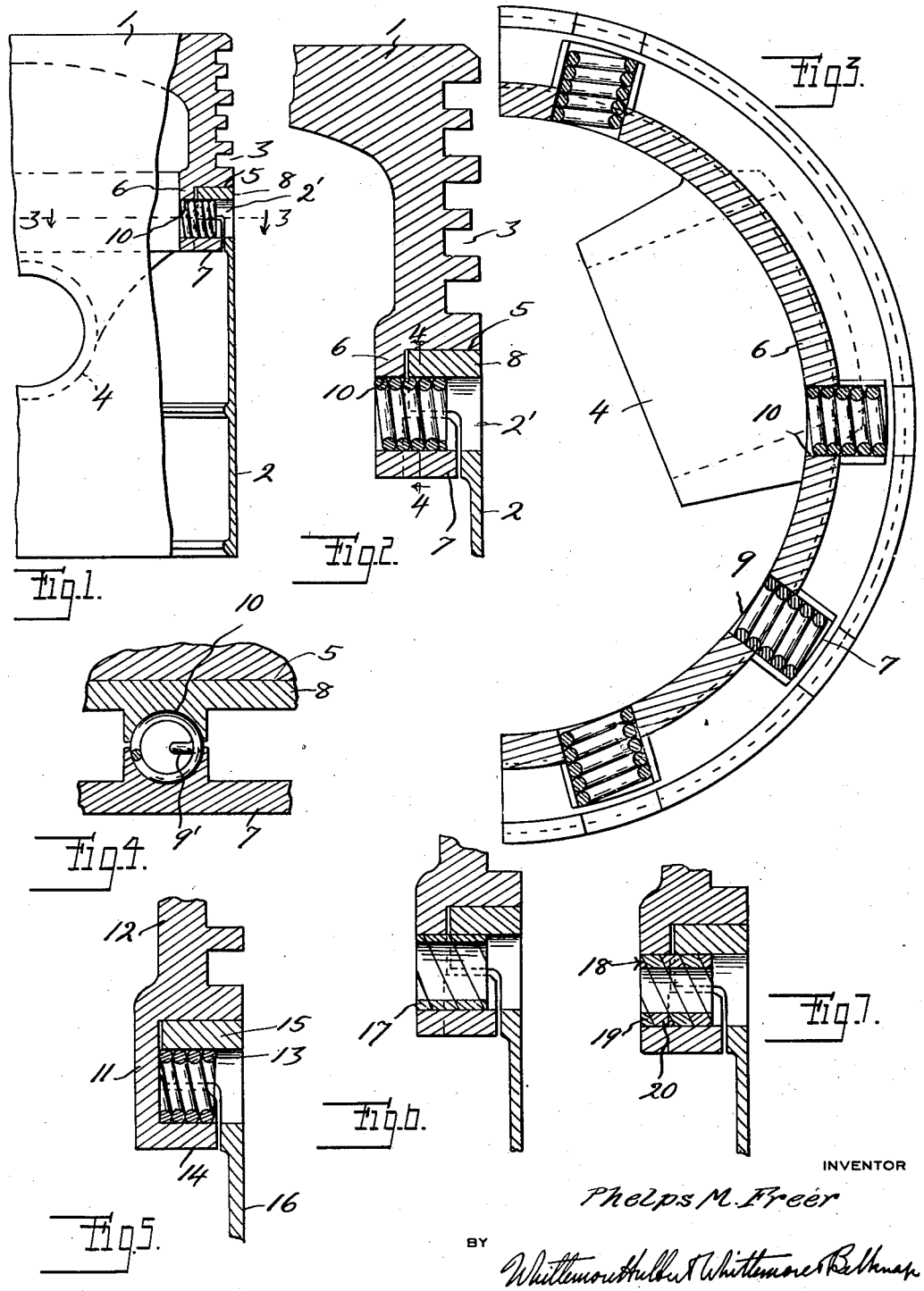

1,860,735

UNITED STATES PATENT OFFICE

PHELPS M. FREER, OF DETROIT, MICHIGAN

PISTON

Application filed April 14, 1930. Serial No. 444,252.

The invention relates to pistons of that type having separately formed heads and skirts. One of the objects of the invention is to so constructed the piston that its head and skirt may expand and contract unequally without affecting its operation. Another object is to provide improved means for securing the head and skirt together constructed to permit the unequal expansion and contraction of the head and skirt and also to hold the head and skirt from relative bodily movement. A further object is to provide securing means which maintains contact with the head and skirt irrespective of their states of expansion and contraction, whereby relative play of the head and skirt is prevented. With these and other objects in view, the invention resides in the novel features as more fully hereinafter set forth.

In the drawings:—

Figure 1 is a sectional elevation of a piston showing an embodiment of my invention;

Figure 2 is an enlarged section thereof;

Figure 3 is an enlarged cross section on the line 3—3 of Figure 1;

Figure 4 is a cross section on the line 4—4 of Figure 2;

Figures 5, 6 and 7 are views similar to Figure 2, showing modifications.

The piston comprises the head 1 and the skirt 2, the former being preferably formed of aluminum or an aluminum alloy and being preferably out of engagement with the wall of the cylinder in which the piston operates and the latter being preferably formed of iron and being adapted for engagement with the wall of the cylinder. The head 1 has the annular grooves 3 for receiving the piston rings and the pair of diametrically opposite hubs 4 for receiving the wrist pin which connects the connecting rod to the piston. The head 1 has the annular shoulder 5 for engaging the upper end of the skirt 2 and the depending annular flange 6, which is concentric with the head 1 and is offset radially inwardly of the head from the annular shoulder 5.

To secure the head and skirt together, I have provided the annular series of peripherally spaced radially extending projections 7 formed integrally with the depending flange 6 and extending outwardly from its lower edge and also the annular series of peripherally spaced radially extending projections 8 formed integrally with the skirt 2 and extending inwardly from its upper end. The skirt 2 is adapted to be telescopically engaged with the head 1 by passing the projections 8 between the projections 7, after which the skirt is rotated relative to the head to position the projections 8 above the projections 7 or in overlapping relation radially of the piston. These projections 7 and 8 are radially spaced from the skirt and the depending flange 6 of the head to provide for relative expansion of the head and skirt. I have further provided the radially extending securing members 9, which are positioned between the overlapping projections 7 and 8. Each of these securing members, as illustrated in the present embodiment, is tubular and engages arcuate bearing faces formed in the projections 7 and 8, these projections preferably terminating at points to be spaced from each other when the head and skirt are in operative position. More in detail, each securing member is a spiral formed of resilient wire with the outer face of each convolution forming the spiral preferably flat.

Each spiral securing member, as illustrated in Figures 1 to 4 inclusive, further extends within the radially extending circular opening 10, which is formed in the depending flange 6. Each of these securing members is under compression radially of these securing members by reason of the fact that the openings 10 and also the openings formed between the overlapping projections 7 and 8 are of smaller diameter than the normal outer diameter of the securing members, so that upon expansion of the head and skirt or either the head and skirt and consequent expansion of these openings the securing members expand, due to their resiliency, to remain in firm contact with the walls of the openings and thereby prevent relative play of the head and skirt longitudinally of the piston. These securing members are inserted into place by being passed through the radially extending openings 2' in the skirt and are formed with the inturned ends 9' for facilitating their insertion by suitable tools, which through the inturned ends can wind up the coils to reduce their diameter.

Inasmuch as the securing members have the upper portions of certain of their convolutions engaging the projections of the skirt and the lower portions of these convolutions engaging the projections formed upon the head, expansion of the skirt in a direction radially of the piston is taken care of by the convolutions sliding over the projections upon the skirt, since these projections are formed of the same material, such as iron, as the skirt. On the other hand, since these securing members have one or more convolutions engaging in the openings formed in the head, they will be held from longitudinal displacement in these openings by reason of binding of these convolutions against the walls of the openings. Since the securing members are arranged in an annular series around the piston and they further extend radially, they serve in preventing relative bodily movement of the head and skirt and thereby center the one relative to the other.

In the modification illustrated in Figure 5, the piston has the same general arrangement of parts with the exception that the depending flange 11 of the head 12 is imperforate and the spiral securing members 13 are shorter and are located between the radially extending overlapping projections 14 and 15, respectively, upon the head 12 and the skirt 16. These securing members are held under compression by these projections so that they function to secure the head and skirt together and prevent relative play therebetween, to provide for relative expansion and contraction of the head and skirt and to center the head and skirt relative to each other.

In the modification illustrated in Figure 6, the piston has the same general arrangement of parts as that shown in Figures 1 to 4 inclusive, with the exception that the resilient securing members 17 are formed from flat stock of greater width than the diameter of the wire forming the securing members 9 and the pitch or the angle of inclination of the convolutions of the axes of these securing members is greater than the pitch of the securing members 9.

The piston has the same general arrangement of parts in the modification illustrated in Figure 7, but the securing members 18, instead of being formed of single spirals, are each formed of the inner-wound spiral resilient wire members 19 and 20. These spiral members have a polygonal and preferably square cross section and their pitch or lead is preferably the same as that of the securing member 17, shown in Figure 6.

What I claim as my invention is:

1. In a piston, the combination with head and skirt members, of individual radially extending expansible means under compression engaging said head and skirt members for securing the same together, said individual means extending substantially at right angles to the axis of the piston.

2. In a piston, the combination with head and skirt members, of individual radially extending resilient means extending substantially at right angles to the axis of the piston and engaging said head and skirt members and normally held under compression thereby for securing said head and skirt members together.

3. In a piston, the combination with head and skirt members, of an annular series of radially extending expansible members extending substantially at right angles to the axis of the piston and engaging said head and skirt members and normally held under compression thereby for securing said head and skirt members together and holding the same from relative bodily movement.

4. In a piston, the combination with head and skirt members, of radially extending tubular members engaging said head and skirt members for securing the same together, said tubular members being expansible and normally held under compression by said head and skirt members.

5. In a piston, the combination with head and skirt members, of spiral means engaging said head and skirt members and normally held thereby under compression radially of said spiral means for securing said head and skirt members together.

6. In a piston, the combination with head and skirt members, of a series of radially extending spiral members engaging said head and skirt members and normally held thereby under compression radially of said spiral members for securing said head and skirt members together.

7. In a piston, the combination with head and skirt members having portions overlapping radially of the piston, of radially extending resilient spiral members between said portions and normally held under compression radially of said spiral members for securing said head and skirt members together.

8. In a piston, the combination with head and skirt members having axially abutting portions, of oppositely facing overlapping bearings on said head and skirt members and radially compressed tubular resilient members between said bearings for holding said skirt and head members in concentric engagement, permitting of independent radial expansion.

In testimony whereof I affix my signature.

PHELPS M. FREER.